United States Patent [19]
Satoh et al.

[11] Patent Number: 5,584,278
[45] Date of Patent: Dec. 17, 1996

[54] SYSTEM FOR CONTROLLING FUEL VAPOR FLOW DISCHARGED FROM A FUEL TANK TO A CANISTER

[75] Inventors: Kazuo Satoh, Yokohama; Junya Ohno, Atsugi; Junichi Hanai, Samukawa-machi, all of Japan

[73] Assignees: Nissan Motor Co., Ltd., Yokohama; NKG Corporation, Tokyo, both of Japan

[21] Appl. No.: 573,032

[22] Filed: Dec. 15, 1995

[30] Foreign Application Priority Data

Dec. 15, 1994 [JP] Japan .................. 6-311589

[51] Int. Cl.$^6$ ............................... F02M 33/02
[52] U.S. Cl. ............... 123/516; 137/587; 141/59
[58] Field of Search .................. 123/516, 518, 123/519; 137/587, 588, 589; 141/59

[56] References Cited

U.S. PATENT DOCUMENTS

| | | | |
|---|---|---|---|
| 4,706,708 | 11/1987 | Fomuto et al. | 137/588 |
| 4,790,349 | 12/1988 | Harris | 137/587 |
| 4,809,863 | 3/1989 | Woodcock et al. | 220/85 |
| 5,054,508 | 10/1991 | Benjey | 137/43 |
| 5,099,880 | 3/1992 | Sziaga et al. | 137/587 |
| 5,215,132 | 6/1993 | Kobayashi | 140/302 |
| 5,282,497 | 2/1994 | Allison | 141/59 |
| 5,318,069 | 6/1994 | Harris | 123/519 |
| 5,388,611 | 2/1995 | Harris | 123/519 |
| 5,392,804 | 2/1995 | Kondo et al. | 123/519 |
| 5,404,906 | 4/1995 | Aoshima et al. | 137/587 |
| 5,417,240 | 5/1995 | Benjey | 123/519 |
| 5,462,100 | 10/1995 | Covert et al. | 141/59 |
| 5,474,048 | 12/1995 | Yamazaki et al. | 123/519 |
| 5,497,800 | 3/1996 | Ohashi et al. | 123/519 |
| 5,524,662 | 6/1996 | Benjey et al. | 137/587 |

FOREIGN PATENT DOCUMENTS

1-96336  6/1989  Japan.

*Primary Examiner*—Thomas N. Moulis
*Attorney, Agent, or Firm*—Foley & Lardner

[57] ABSTRACT

A fuel control system includes a valve assembly disposed between a fuel tank with a filler tube and a fuel vapor storage canister. The valve assembly includes a housing having a vapor inlet port for establishing communication with the fuel tank at a level above the full level of fuel contained in the fuel tank, and a vent inlet port for establishing communication with the fuel tank until the full level is reached by fuel contained in the fuel tank. An outlet port is provided for establishing communication with the canister. A conduit is provided for transmiting signal pressure for establishing communication with the filler tube at a level above the fuel level of fuel in the filler tube. First and second check valves are mounted within the housing and respectively include valve seats, valve elements, springs and diaphragms. The diaphragms cooperate with the housing to define a signal pressure chamber communicating with the conduit. The first diaphragm acts on the first valve element against the action of the first spring in response to a difference between the pressure within the signal pressure chamber and the reference pressure. The second diaphragm acts on the second valve element in a direction assisting the action of the second spring in response to a difference between the pressure within the signal pressure chamber and the pressure at the outlet port.

17 Claims, 3 Drawing Sheets

SYSTEM FOR CONTROLLING FUEL VAPOR FLOW DISCHARGED FROM A FUEL TANK TO A CANISTER

BACKGROUND OF THE INVENTION

The present invention relates to a system for controlling a flow of fuel vapor discharged from a fuel tank to a fuel vapor storage canister of motor vehicles.

Fuel control systems for controlling a fuel vapor flow discharged from a fuel tank to a fuel vapor storage canister, are well known. One example of such fuel control systems includes a check valve connected with a fuel tank having a filler tube. The check valve is mounted on near an inlet opening of the filler tube through which liquid fuel is supplied to the fuel tank. The check valve is adapted to be operated by insertion of a filler gun into the inlet opening of the filler tube for controlling a fuel vapor flow discharged from the fuel tank to a fuel vapor storage canister.

Japanese Utility Model Application First Publication No. 1-96336 discloses a fuel control system including a check valve mounted on an upper inlet portion of a filler tube of a fuel tank. The check valve is connected via a first fuel vapor tube with the fuel tank and via a second fuel vapor tube with a main canister. The check valve is also connected via a first vent tube with the fuel tank and via a second vent tube with a subsidiary canister. When a filler gun is inserted into an inlet opening of the filler tube, the check valve operates to prevent fluid communication between the first and second vapor tubes and allow fluid communication between the first and second vent tubes. When the filler gun is not inserted into the inlet opening of the fuel tank, the check valve operates to prevent the fluid communication between the first and second vent tubes and allow the fluid communication between the first and second fuel vapor tubes.

U.S. patent Ser. No. 5,099,880 discloses a fuel vapor venting control valve assembly including a check valve. The check valve has a valve seat, a valve element cooperating the valve seat, and a spring and a diaphragm which bias the valve element to be moveable between a flow-blocking position and a flow-delivery position.

An object of the present invention is to provide a valve assembly serving for effectively controlling a fuel vapor flow discharged from a fuel tank to a fuel vapor storage canister, and a fuel control system having an increased operating performance.

SUMMARY OF THE INVENTION

According to one aspect of the present invention, there is provided a valve assembly for controlling a flow of fuel vapor discharged from a fuel tank to a fuel vapor storage canister, the fuel tank having a filler tube through which fuel is fed to the fuel tank, the valve assembly comprising:

a housing having inlet port means adapted for establishing communication with the fuel tank at a level above the full level of fuel contained in the fuel tank, and outlet port means adapted for establishing communication with the fuel vapor storage canister;

the housing also having signal pressure port means adapted for establishing communication with the fuller tube at a level above the fuel level of fuel contained in the filler tube;

a check valve mounted within the housing and fluidly disposed between the inlet port means and the outlet port means, the check valve including a valve seat communicating with the first inlet port means and a valve element cooperating with the first valve seat; and biasing means mounted within the housing for biasing the valve element toward the valve seat, the biasing means including a spring acting on and biasing the valve element toward the valve seat and a diaphragm;

the diaphragm cooperating with the housing to define within the housing a signal pressure chamber communicating with the signal pressure port means;

the diaphragm having one side exposed to a reference pressure as high as the ambient atmosphere and the opposite side exposed to a pressure within the signal pressure chamber, the diaphragm acting on and biasing the valve element against the action of the spring in response to a difference between the pressure within the signal pressure chamber and the reference pressure.

According to another aspect of the present invention, there is provided a fuel vapor control system comprising:

a fuel tank having a filler tube through which fuel is fed to the fuel tank;

a fuel vapor storage canister;

a valve assembly including a housing having inlet port means adapted for establishing communication with the fuel tank at a level above the full level of fuel contained in the fuel tank, and outlet port means adapted for establishing communication with the fuel vapor storage canister;

the housing also having signal pressure port means adapted for establishing communication with the filler tube at a level above the fuel level of fuel contained in the filler tube;

a check valve mounted within the housing and fluidly disposed between the inlet port means and the outlet port means, the check valve including a valve seat communicating with the first inlet port means and a valve element cooperating with the first valve seat; and biasing means mounted within the housing for biasing the valve element toward the valve seat, the biasing means including a spring acting on and biasing the valve element toward the valve seat and a diaphragm;

the diaphragm cooperating with the housing to define within the housing a signal pressure chamber communicating with the signal pressure port means;

the diaphragm having one side exposed to a reference pressure as high as the ambient atmosphere and the opposite side exposed to a pressure within the signal pressure chamber, the diaphragm acting on and biasing the valve element against the action of the spring in response to a difference between the pressure within the signal pressure chamber and the reference pressure.

According to further aspect of the present invention, there is provided a fuel vapor control system comprising:

a fuel tank having a filler tube through which fuel is fed to the fuel tank;

a fuel vapor storage canister;

a valve assembly including a housing having first inlet port means adapted for establishing communication with the fuel tank at a level above the full level of fuel contained in the fuel tank, second inlet port means adapted for establishing communication with the fuel tank at the full level of fuel contained in the fuel tank, and outlet port means adapted for establishing communication with the fuel vapor storage canister;

the housing also having signal pressure port means adapted for establishing communication with the filler tube at a level above the fuel level of fuel contained in the filler tube;

a first check valve mounted within the housing and fluidly disposed between the first inlet port means and the outlet port means, the first check valve including a first valve seat communicating with the first inlet port means and a first valve element cooperating with the first valve seat;

first biasing means mounted within the housing for biasing the first valve element toward the first valve seat, the first biasing means including a first spring acting on and biasing the first valve element toward the first valve seat and a first diaphragm;

a second check valve mounted within the housing and fluidly disposed between the second inlet port means and the outlet port means, the second check valve including a second valve seat communicating with the second inlet port means and a second valve element cooperating with the second valve seat; and second biasing means mounted within the housing for biasing the second valve element toward the second valve seat, the second biasing means including a second spring acting on and biasing the second valve element toward the second valve seat and a second diaphragm;

the first and second diaphragms cooperating with the housing to define within the housing a signal pressure chamber communicating with the signal port means;

the first diaphragm having one side exposed to a reference pressure as high as the ambient atmosphere and the opposite side exposed to a pressure within the signal pressure chamber, the first diaphragm acting on and biasing the first valve element against the action of the first spring in response to a difference between the pressure within the signal pressure chamber and the reference pressure;

the second diaphragm having one side exposed to the pressure within the signal pressure chamber and the opposite side exposed to a pressure at said outlet port means, the second diaphragm acting on and biasing the second valve element in a direction assisting the action of the second spring in response to a difference between the pressure within the signal pressure chamber and the pressure at the outlet port means.

DESCRIPTION OF THE PREFERRED EMBODIMENT

Figure 1:
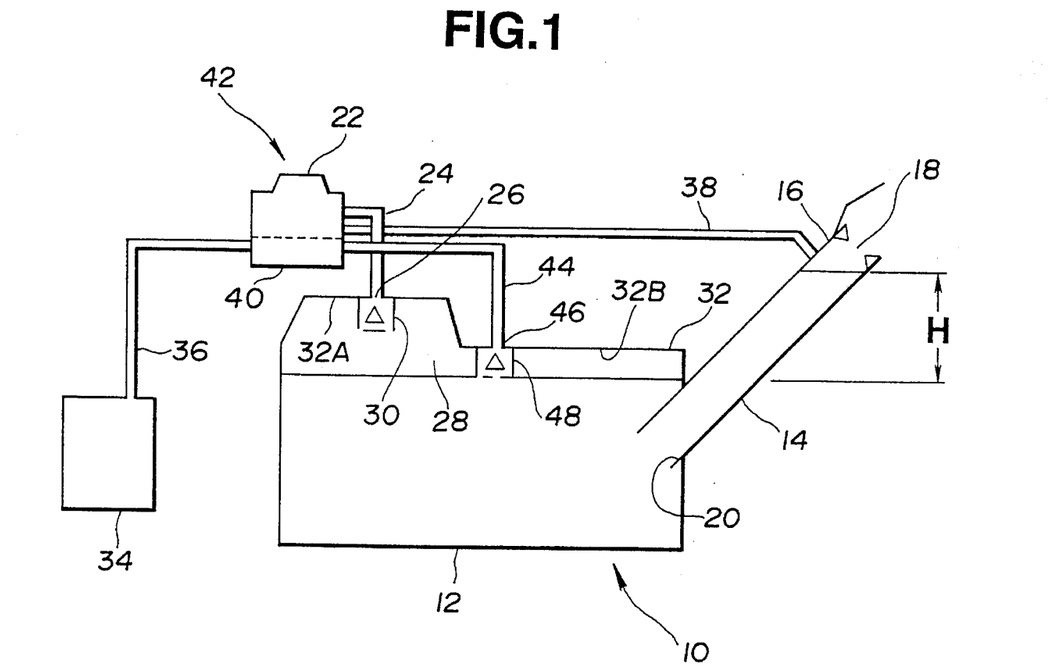
FIG. 1 is a schematic diagram of a preferred embodiment of a fuel vapor control system according to the present invention.

Referring now to FIG. 1, there is shown a fuel vapor control system for use in a vehicle, according to the present invention.

As illustrated in FIG. 1, the fuel vapor control system includes a fuel tank 10 having a tank body 12, and a filler tube 14 communicated with the tank body 12. The filler tube 14 has an inlet portion 16 located at a level above the fuel level of liquid fuel contained in the filler tube 14. The inlet portion 16 is formed with an inlet opening 18 which is normally closed with a filler cap (not shown) and open to the ambient atmosphere by removing the filler cap therefrom. The filler tube 14 has an outlet portion 20 communicated with an inside of the tank body 12.

A first check valve 22 is connected to the tank body 12 via a fuel vapor tube 24. The fuel vapor tube 24 has a vapor inlet 26 open into a vapor dome 28 of the tank body 12 in which fuel vapor evaporated from liquid fuel in the tank body 12 is collected. A vapor-cut valve 30 including a float is disposed within the tank body 12 to be connected with the vapor inlet 26. The vapor-cut valve 30 is arranged on a higher-level portion 32A formed on an upper wall 32 of the tank body 12 such that the vapor-cut valve 30 is at a level above the full level of liquid fuel contained i the fuel tank 10. The first check valve 22 is connected to a fuel vapor storage canister 34 via a downstream vent tube 36. The fuel vapor storage canister 34 is connected to an internal combustion engine (not shown).

The first check valve 22 is connected with the filler tube 14 through a conduit 38. The conduit 38 has one end connected with the inlet portion 16 of the filler tube 14 spaced downwardly as viewed in FIG. 1, from the inlet opening 18 of the filler tube 14, and an opposite end disposed within the first check valve 22.

A second check valve 40 is juxtaposed with the first check valve 22 to form a unitary valve assembly 42 in cooperation with the first check valve 22. The second check valve 40 is connected to the tank body 12 via an upstream vent tube 44. The upstream vent tube 44 has an upstream vent inlet 46 open into the vapor dome 28 of the tank body 12. A vent-cut valve 48 including a float is disposed within the tank body 12 to be connected with the upstream vent inlet 46. The vent-cut valve 48 is arranged on a lower-level portion 32B of the upper wall 32 of the tank body 12 which is located lower than the higher-level portion 32A but higher than the outlet portion 20 of the filler tube 14. Thus, the vent-cut valve 48 is lower in height level than the vapor-cut valve 30 disposed on the higher-level portion 32A. The vent-cut valve 48 is located at the full level of liquid fuel contained in the fuel tank 10. The second check valve 40 is also connected to the fuel vapor storage canister 34 via the downstream vent tube 36.

Figure 2:
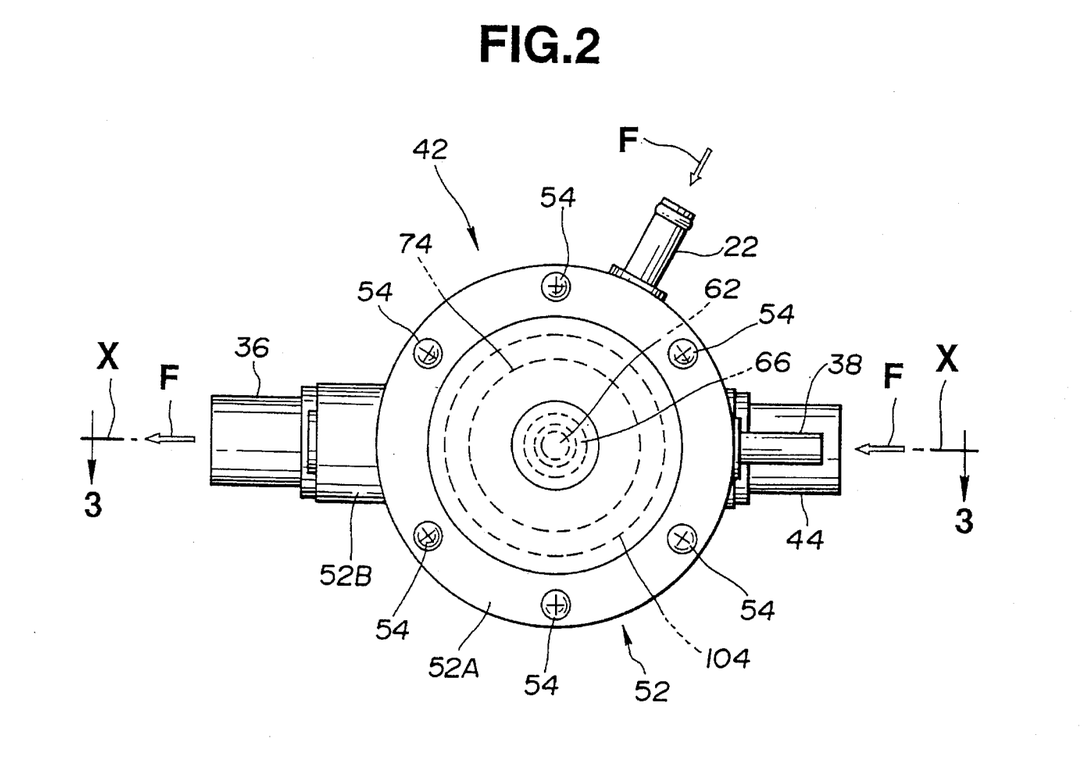
FIG. 2 is a top plan view of a valve assembly used in the fuel vapor control system of FIG. 1.
Figure 3:
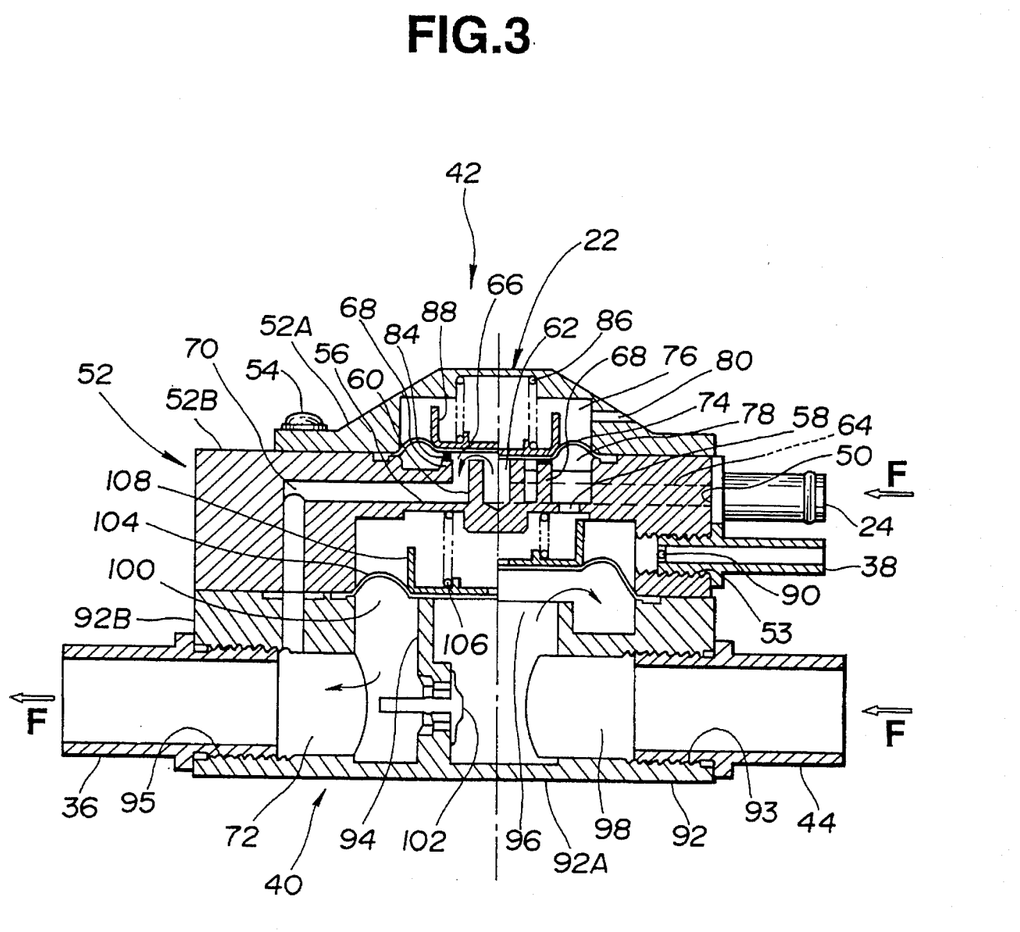
FIG. 3 is an enlarged section taken along line X—X of FIG. 2, showing different positions of first and second check valves of the valve assembly on the left and right sides, respectively.
Figure 4:
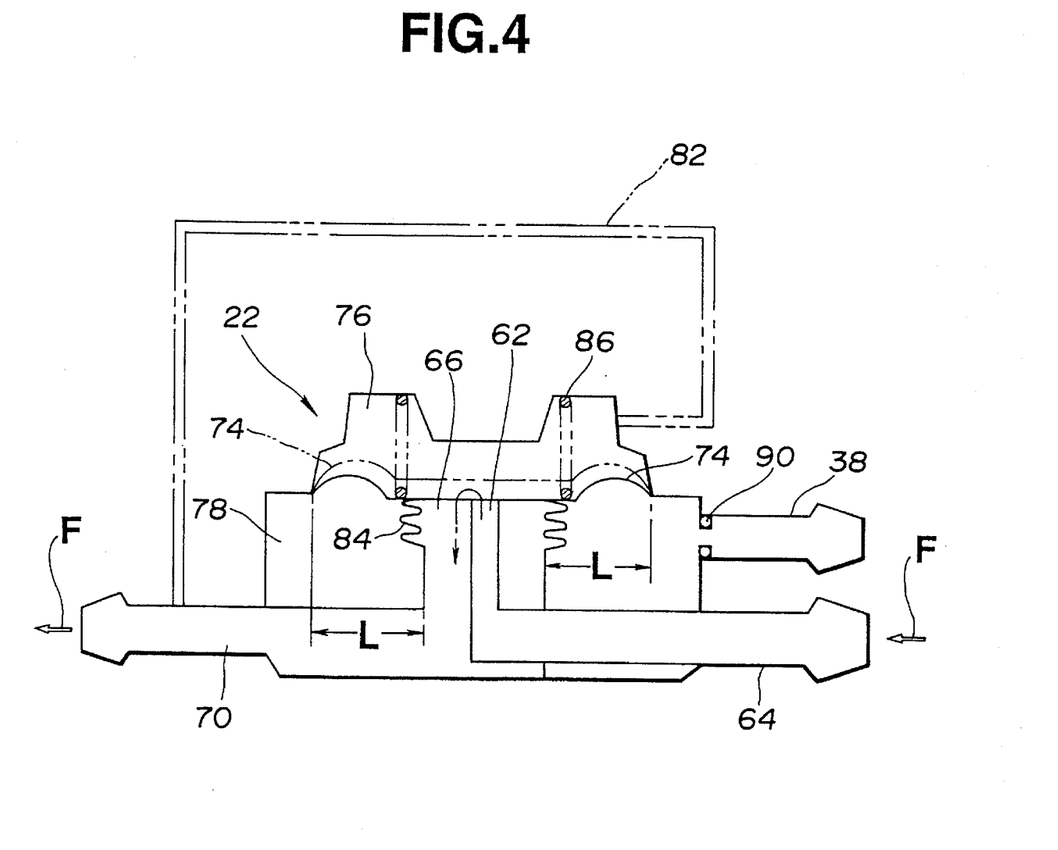
FIG. 4 is a schematic diagram of a first check valve of the valve assembly.

Referring to FIGS. 2 to 4, the structural arrangement of the valve assembly 42 will now be explained. In FIGS. 2 to 4, a flow of fuel vapor is indicated by arrows F.

As shown in FIG. 3, the valve assembly 42 includes a unitary housing composed of a first housing 52 of the first check valve 22 and a second housing 92 of the second check valve 40. As seen from FIGS. 2 and 3, the first housing 52 has a frusto-conical shaped cover portion 52A and a generally cylindrical shaped base portion 52B. The cover portion 52A and the base portion 52B are coupled together by means of fastening members 54 to form the unitary housing 52.

FIG. 3 illustrates the valve assembly 42 the left half of which shows a closed position of the first check valve 22 and an open position of the second check valve 40, and the right half of which shows an open position of the first valve check valve 22 and a closed position of the second check valve 40.

As illustrated in FIG. 3, the cover portion 52A has a wall defining an inside space and an air passage 80 extending outwardly in a radial direction of the cover portion 52A to be open to the ambient atmosphere. The base portion 52B has a wall which defines an inside space, a vapor inlet port 50 connected with the fuel vapor tube 24, and a signal pressure port 53 connected with the conduit 38. A partition wall 56 is formed integrally with the wall of the base portion 52B to substantially divide the inside space into upper and lower sections as viewed in FIG. 3. The partition wall 56 has a passage 58 through which the upper and lower sections of the inside space of the base portion 52B are communicated with each other. Formed on the partition wall 56 is an inner cylindrical wall 60 an inner circumferential surface of which defines a vapor outlet opening 62 having one lower end closed by a portion of the partition wall 56, and the other upper end open upwardly. The vapor outlet opening 62 is connected with a first fuel vapor passageway 64 extending outwardly in a radial direction of the base portion 52B to communicate via the vapor inlet port 50 with the fuel vapor tube 24 which is fitted to the base portion 52B. Disposed outside the inner cylindrical wall 60 is an annular vapor inlet opening 66 defined by an outer circumferential surface of the inner cylindrical wall 60, an upper surface of the partition wall 56, and an inner surface of an intermediate wall 68. The annular vapor inlet opening 66 is arranged concentrically with the vapor outlet opening 62 of a generally circular shape, as indicated in broken lines in FIG. 2. The annular vapor inlet opening 66 is so designed to have an opening area greater than the vapor outlet opening 62. The annular vapor inlet opening 66 is connected at its lower portion with a second fuel vapor passageway 70. The second fuel vapor passageway 70 extends outwardly radially in the base portion 52B and directs downwardly to be connected with a downstream vent passageway 72. The downstream vent passageway 72 is communicated via a vent outlet port 95 with the downstream vent tube 36. Thus, the vapor inlet port 50, the fuel vapor tube 24, the first fuel vapor passageway 64, and the vapor outlet opening 62 provide a first vapor passage, and the vapor inlet opening 66, the second fuel vapor passageway 70, the downstream vent passageway 72, the vent outlet port 95, and the downstream vent tube 36 provide a second vapor passage.

A first diaphragm 74 made of a resilient material such as rubber sheet is disposed within the housing 52 such that a peripheral edge portion of the first diaphragm 74 is sandwiched between the cover portion 52A and the base portion 52B of the housing 52. Thus, the first diaphragm 74 is secured to the housing 52. The first diaphragm 74 has a central flat portion and a peripheral curved portion which is swelled upwardly as viewed in FIG. 3 and extends between the central flat portion and the peripheral edge portion secured to the housing 52. The first diaphragm 74 is arranged in concentrical relation to the vapor outlet opening 62 and the vapor inlet opening 66.

The first diaphragm 74 divides the inside space of the housing 52 into a first chamber 76 and a second chamber 78. The first chamber 76 communicates with the ambient atmosphere through the air passage 80. The air passage 80 can be connected to the second fuel vapor passageway 70 as indicated in broken line 82 in FIG. 4, and communicated with the ambient atmosphere such that foreign subjects are prevented from entering the air passage. Thus, the first diaphragm 74 has an upper side exposed to a reference pressure as high as the ambient atmosphere. The first diaphragm 74 is connected with the intermediate wall 68 by a bellows expansion joint 84. The bellows expansion joint 84 separates the second chamber 78 from the vapor outlet opening 62 and the vapor inlet opening 66 to prevent a fluid communication therebetween. The first diaphragm 74 has a lower side including a first area of the central flat portion which is exposed to a fluid pressure in the vapor dome 28 of the tank body 12 through the vapor outlet opening 62, and a second area of the peripheral curved portion which is exposed to a fluid pressure in the inlet portion 16 of the filler tube 14 through the second chamber 78.

A first spring 86 is disposed within the first chamber 76 between the wall of the cover portion 52A and the first diaphragm 74. The first spring 86 has one end, i.e., an upper end as viewed in FIG. 3, supported on an upper end wall portion of the frusto-conical cover portion 52A. Disposed between the other end, i.e., a lower end as viewed in FIG. 3, of the first spring 86 and the first diaphragm 74 is a first spring retainer 88 which is secured or adhered to one surface, i.e., an upper surface as viewed in FIG. 3, of the central flat portion of the first diaphragm 74. The first spring retainer 88 is generally of a cup shape as illustrated in FIG. 3, and formed with a center area exposed to a fluid pressure in the vapor dome 28 of the tank body 12 through the vapor outlet opening 62 together with the first area of the central flat portion of the first diaphragm 74. The first spring 86 biases the first spring retainer 88 and the central flat portion of the first diaphragm 74 to close the vapor outlet opening 62. As is apparent from the above description, an upper peripheral edge of the inner cylindrical wall 60 serves as a valve seat and the central flat portion of the first diaphragm 74 and the first spring retainer 88 serve as a valve element of the first check valve 22. The first spring 86 biases the valve element toward the valve seat viz. downward as viewed in FIG. 3. The first check valve 22 has the closed position as shown on the right side of FIG. 3, at which the vapor outlet opening 62 is prevented from being fluidly communicated with the vapor inlet opening 66 so that a fluid communication between the first and second fuel vapor passageways 64 and 70 is blocked to thereby prevent a fluid communication between the fuel tank 10 and the fuel vapor storage canister 32 via the first and second vapor passages.

On the other hand, the second chamber 78 is communicated with an inside space of the inlet portion 16 of the filler tube 14 via the conduit 38. The second chamber 78 acts as a signal pressure chamber to which a fluid pressure built in the inside space of the inlet portion 16 of the filler tube 14 is transmitted. The peripheral curved portion of the first diaphragm 74 is exposed to the fluid pressure in the inlet portion 16 of the filler tube 14. Thus, the peripheral curved portion of the first diaphragm 74 acts on and biases the valve element of the first check valve 22 against the action of the first spring 86 in response to a difference between the fluid pressure in the inlet portion 16 of the filler tube 14 and the reference pressure. The peripheral curved portion of the first diaphragm 74 acts on the valve element upward as viewed in FIG. 3. The first spring 86 has a biasing force adjusted to such a predetermined value as to urge the valve element to be in the closed position in a case where the inlet portion 16 of the filler tube 14 is communicated through the inlet opening 18 with the ambient atmosphere. The first check valve 22 is moveable between the closed position and the open position shown on the left side of FIG. 3. When the first check valve 22 is in the open position, the vapor outlet opening 62 is fluidly communicated with the vapor inlet opening 66 so that the first and second fuel vapor passageways 64 and 70 are fluidly communicated with each other to thereby allow a fluid communication between the fuel tank 10 and the fuel vapor storage canister 34 via the first and second vapor passages.

An orifice 90 is disposed at the opposite end of the conduit 38 fitted into the base portion 52B of the housing 52. The orifice 90 serves for preventing liquid fuel in the filler tube 14 from flowing through the conduit 38 into the second chamber 78.

The aforementioned concentrical arrangement of the first diaphragm 74, the vapor outlet opening 62, and the vapor inlet opening 66 provides a good balance of the fluid pressure acting on the valve element of the first check valve 22. This contributes to a stable operation of the first check valve 22.

As seen from FIGS. 2 and 3, the second check valve 40 includes a generally cylindrical housing 92. The housing 92 has a wall defining a vent inlet port 93 connected with the upstream vent tube 44, and the vent outlet port 95 connected with the downstream vent tube 36. A generally cylindrical inner wall 94 is formed integrally with the housing 92, an inner circumferential surface of which defines a vent outlet opening 96. The vent outlet opening 96 has a lower end closed by a bottom wall 92A of the housing 92 and an upper end opened upwardly. The vent outlet opening 96 is connected at its lower portion with an upstream vent passageway 98 extending radially outwardly to communicate via the vent inlet port 93 with the upstream vent tube 44 which is fitted to the housing 92. An annular vent inlet opening 100 is disposed outside the cylindrical inner wall 94 and defined by an outer circumferential surface of the cylindrical inner wall 94, an inner circumferential surface of an outer wall 92B extending outwardly in the radial direction of the housing 92, and the bottom wall 92A of the housing 92. The annular vent inlet opening 100 is arranged concentrically with the vent outlet opening 96. A negative pressure relieve valve 102 is provided on the cylindrical inner wall 94 serving as a partition wall which separates the vent outlet opening 96 and the vent inlet opening 100 from each other. The vent inlet opening 100 is connected at its lower portion with the downstream vent passageway 72 extending outwardly in the radial direction of the housing 92 to communicate via the vent outlet port 95 with the downstream vent tube 36 which is fitted to the housing 92 in a diametrically opposed relation to the upstream vent tube 44. The downstream and upstream vent tubes 36 and 44 are greater in diameter than the fuel vapor tube 22. Thus, the upstream vent tube 44, the vent inlet port 93, the upstream vent passageway 98, and the vent outlet opening 96 provide a first vent passage, and the downstream vent tube 36, the vent outlet port 95, the downstream vent passageway 72, and the vent inlet opening 100 provide a second vent passage.

Disposed at an upper end of the housing 92 of the second check valve 40 is a second diaphragm 104 which is made of a resilient material such as rubber sheet as well as the first diaphragm 74 but greater in size than the first diaphragm 74. The second diaphragm 104 is secured to the housing 92 at a peripheral edge portion thereof which is sandwiched between the outer wall 92B of the housing 92 and the base portion 52B of the housing 52 of the first check valve 22. The second diaphragm 104 has a central flat portion and a peripheral curved portion which is swelled upwardly as viewed in FIG. 3 and interposed between the central flat portion and the peripheral edge portion. The second diaphragm 104 is disposed adjacent below the second chamber 78. Thus, the first and second diaphragms 74 and 104 cooperate with the unitary housing to define the second chamber 78 within the unitary housing. The second diaphragm 104 has an upper side opposed to the second chamber 78 and a lower side including the central flat portion opposed to an upper end of the vent outlet opening 96 and the peripheral curved portion opposed to the vent inlet opening 100. Thus, the second diaphragm 104 is exposed on the upper side to a fluid pressure within the signal pressure chamber 78 and exposed on the lower side to a fluid pressure in the vapor dome 28 via the vent outlet opening 96. The second diaphragm 104 is so configured and arranged as to be in concentrical relation to the vent outlet opening 96 and the vent inlet opening 100 as well as the first diaphragm 74. This arrangement serves for a stable operation of the second check valve 40.

A second spring 106 is disposed between the second diaphragm 104 and the partition wall 56 of the base portion 52B of the housing 52 of the first check valve 22. The second spring 106 has an upper end supported on a lower surface of the partition wall 56 as shown in FIG. 3. A second spring retainer 108 of a generally cup shape as shown in FIG. 3, is disposed between the second diaphragm 104 and the second spring 106 and mounts a lower end of the second spring 106. The second spring retainer 108 has a lower surface secured or adhered to an upper surface of the central flat portion of the second diaphragm 104. The second spring retainer 108 is greater in size than the first spring retainer 88. The lower surface of the second spring retainer 108 with the central flat portion of the second diaphragm 104 is exposed to the vent outlet opening 96. An upper surface of the second spring retainer 108 and an upper surface of the peripheral curved portion of the second diaphragm 104 are exposed to the second chamber 78. The second spring 106 biases the second spring retainer 108 and the central flat portion of the second diaphragm 104 to close the vent outlet opening 96. Thus, an upper peripheral edge of the inner cylindrical wall 94 serves as a valve seat, and the central flat portion of the second diaphragm 104 and the second spring retainer 108 serve as a valve element of the second check valve 40. The second spring 106 biases the valve element toward the valve seat. viz. downward as viewed in FIG. 3. The second diaphragm 104 acts on and biases the valve element in a direction assisting the action of the second spring 106 in response to a difference between the fluid pressure within the signal pressure chamber 78 and the fluid pressure within the vent outlet opening 96. The second check valve 40 has the closed position as shown on the left side of FIG. 3, at which the vent outlet opening 96 is prevented from being fluidly communicated with the vent inlet opening 100 so that a fluid communication between the upstream and downstream vent passageways 98 and 72 is blocked to thereby prevent a fluid communication between the fuel tank 10 and the fuel vapor storage canister 34 via the upstream and downstream vent passages.

The fluid pressure in the vapor dome 28 of the tank body 12 acts on the valve element of the second check valve 40 against the action of the second spring 106, viz. upward as viewed in FIG. 3. The second check valve 40 has the open position shown on the right side of FIG. 3, at which the vent outlet opening 96 is allowed to be fluidly communicated with the vent inlet opening 100. This causes the fluid communication between the upstream and downstream vent passageways 98 and 72 to thereby establish a fluid communication between the fuel tank 10 and the fuel vapor storage canister 34 via the upstream and downstream vent passages. The second spring 106 has a biasing force adjusted to such a predetermined value as to urge the valve element to be in the open position of the second check valve 40 at least in a case where the inlet portion 16 of the filler tube 14 is open to the ambient atmosphere via the inlet opening 18. Thus, the second check valve 40 is moveable between the closed position and the open position.

A manner of an operation of the fuel vapor control system will now be explained.

In a condition that the inlet opening 18 of the filler tube 14 is covered with the filler cap, when a fluid pressure P1 in the vapor dome 28 of the tank body 12 increases, a fluid pressure P2 in the inlet portion 16 of the filler tube 14 increases similarly. The fluid pressure P1 in the vapor dome 28 is exerted on the valve element of the first check valve 22 through the vapor outlet opening 62 against the action of the first spring 86. The fluid pressure P2 in the inlet portion 16 of the filler tube 14 is exerted through the second chamber 78 on the peripheral curved portion of the first diaphragm 74 against the action of the first spring 86. The fluid pressure P2 acts on an area L, as indicated in FIG. 4, of the peripheral curved portion of the first diaphragm 74. The first chamber 76 is under the atmospheric pressure acting as the reference pressure. When the total of the fluid pressures P1 and P2 is greater than the reference pressure, the valve element of the first check valve 22 is moved to the position as indicated in solid line in FIG. 4 against the action of the first spring 86. This causes a fluid communication between the fuel tank 10 and the fuel vapor storage canister 32, serving for restricting an excessive increase in the pressure of fuel vapor in the tank body 12.

In the same condition, the fluid pressure P1 is exerted through the vent outlet opening 96 on the lower side of the valve element of the second check valve 40, while the fluid pressure P2 is exerted through the second chamber 78 on the upper side of the valve element of the second check valve 40 and the upper side of the second diaphragm 104. Then, the valve element of the second check valve 40 is forced to be in the closed position shown on the left side of FIG. 3.

If a negative pressure is caused by a suction of the engine operation and transmitted to the downstream vent tube 36 and the second fuel vapor passageway 70, the valve element of the first check valve 22 and the valve element of the second check valve 40 both are moved to the closed positions. This prevents the tank body 12 from being subject to the negative pressure which is transmitted through the first fuel vapor passageway 64 and the fuel vapor tube 22, and the upstream vent passageway 98 and the upstream vent tube 44.

In a case where a negative pressure is caused in the tank body 12, the negative pressure relief valve 102 in the second check valve 40 is open to limit the negative pressure. The negative pressure relief valve 102 is readily mounted by being inserted via the upstream vent tube 44 into the cylindrical inner wall 94. By using the negative pressure relief valve of a bevel shape smaller in diameter than the upstream vent tube 44, the mounting operation of the negative pressure relief valve can be more easily performed.

In a condition that the inlet portion 16 of the filler tube 14 is open to the ambient atmosphere via the inlet opening 18 for refueling, the fluid pressure P2 in the inlet portion 16 is equal to the atmospheric pressure. Therefore, the fluid pressure P2 is transmitted into the second chamber 78 is equal to the fluid pressure in the first chamber 76 communicated with the ambient atmosphere. Thus, the peripheral curved portion of the first diaphragm 74 is exposed to the reference pressure on the upper and lower surfaces. The fluid pressure P1 in the vapor dome 28 is exerted on the valve element of the first check valve 22 through the vapor outlet opening 62. Since the first spring 86 is so constructed as to have the biasing force of the predetermined value which is greater than the fluid pressure P1 under this circumstance, the valve element of the first check vale 22 is moved to the closed position.

On the other hand, the fluid pressure P2, viz. the atmospheric pressure, is exerted through the second chamber 78 on the upper side of the vunder this circumstance, the valve element of the first check vale 22 is moved to the closed position.

On the other hand, the fluid pressure P2, viz. the atmospheric pressure, is exerted through the second chamber 78 on the upper side of the valve element of the second check valve 40 and the second diaphragm 104, while the fluid pressure P1 greater than the reference pressure is exerted through the vent outlet opening 96 on the lower side of the valve element of the second check valve 40. Under this circumstance, the valve element of the second check valve 40 is moved to the open position. Thus, the upstream vent passageway 98 is communicated with the downstream vent passageway 72 so that the fuel vapor in the vapor dome 28 is conducted from the tank body 12 to the fuel vapor storage canister 34. This leads to desirable ventilation during refueling, serving for smooth fuel supply. Each of the upstream vent tuid fuel in the tank body 12, the vent-cut valve 48 shifts to its closed position at which the fuel vapor is prevented from being discharged from the vapor dome 28 through the upstream vent inlet 46 into the upstream vent tube 44. If the liquid fuel is subsequently supplied to reach the full level in the inlet portion 16 of the filler tube 14, the valve element of the first check valve 22 is exposed to a sum of the fluid pressure P1 in the vapor dome 28 and a fluid pressure caused by a difference in height, as indicated at H in FIG. 1, between the full level of the liquid fuel in the tank body 12 and the full level of the liquid fuel in the filler tube 14. The valve element of the first check valve 22 is so adapted to be forced in the closed position by the first spring 86 under this circumstance. Accordingly, when refueling, the level of the liquid fuel supplied to the tank body 12 is restrained from exceeding the full level and kept at a constant full level, whereby the vapor dome 28 is maintained within the tank body 12.

As is appreciated from the above description, the present invention serves for simple arrangement of the valve assembly as compared with the prior art arrangement in which the check valve is mounted on the filler tube and employs relatively longer fuel vapor tubes or pipes connecting the check valve with the fuel vapor storage canister and the vent-cut valve in the fuel tank.

What is claimed is:

1. A valve assembly for controlling a flow of fuel vapor discharged from a fuel tank to a fuel vapor storage canister, the fuel tank having a filler tube through which fuel is fed to the fuel tank, the valve assembly comprising:

a housing having inlet port means adapted for establishing communication with the fuel tank at a level above the full level of fuel contained in the fuel tank, and outlet port means adapted for establishing communication with the fuel vapor storage canister;

said housing also having signal pressure port means adapted for establishing a communication with the filler tube at a level above the fuel level of fuel contained in the filler tube;

a check valve mounted within said housing and fluidly disposed between said inlet port means and said outlet port means, said check valve including a valve seat communicating with said first inlet port means and a valve element cooperating with said first valve seat; and biasing means mounted within said housing for biasing said valve element toward said valve seat, said biasing means including a spring acting on and biasing said valve element toward said valve seat and a diaphragm;

said diaphragm cooperating with said housing to define within said housing a signal pressure chamber communicating with said signal pressure port means;

said diaphragm having one side exposed to a reference pressure as high as the ambient atmosphere and the opposite side exposed to a pressure within said signal pressure chamber, said diaphragm acting on and biasing said valve element against the action of said spring in response to a difference between said pressure within said signal pressure chamber and said reference pressure.

2. A valve assembly as claimed in claim 1, further comprising second inlet port means adapted for establishing communication with the fuel tank until the full level is reached by fuel contained in the fuel tank, a second check valve mounted within said housing and fluidly disposed between said second inlet port means and said outlet port means, said second check valve including a second valve seat communicating with said second inlet port means and a second valve element cooperating with said second valve seat, and second biasing means mounted within said housing for biasing said second valve element toward said second valve seat, said second biasing means including a second spring acting on and biasing said second valve element toward said second valve seat and a second diaphragm disposed adjacent below said signal pressure chamber, said second diaphragm having one side exposed to said pressure within said signal pressure chamber and the opposite side exposed to a pressure at said outlet port means, said second diaphragm acting on said biasing said second valve element in a direction assisting the action of said second spring in response to a difference between said pressure spring in response to a difference between said pressure within said signal pressure chamber and said pressure at said outlet port means.

3. A valve assembly as claimed in claim 1, wherein said diaphragm defines within said housing a chamber communicated with the ambient atmosphere.

4. A valve assembly as claimed in claim 1, wherein said inlet port means includes a vapor outlet opening and a vapor inlet opening sized greater than said vapor outlet opening, said valve element including one side having a first area opposed to said vapor outlet opening and a second area opposed to said vapor inlet opening, and the other side contacted with said spring.

5. A valve assembly as claimed in claim 4, wherein said vapor outlet opening is communicated via a first vapor passage connecting said check valve with said fuel tank and said vapor inlet opening is communicated with a second vapor passage connecting said check valve with said fuel vapor storage canister.

6. A valve assembly as claimed in claim 4, wherein said vapor outlet opening is of a circular shape and said vapor inlet opening is of an annular shape, said vapor outlet opening and said vapor inlet opening being arranged in concentrical relation.

7. A valve assembly as claimed in claim 6, wherein said diaphragm is so configured and arranged as to be in concentrical relation to said vapor outlet opening and said vapor inlet opening.

8. A valve assembly as claimed in claim 4, wherein said vapor inlet opening is separated from said signal pressure chamber by a bellows expansion joint.

9. A valve assembly as claimed in claim 1, wherein said signal pressure chamber is communicated with the filler tube via a conduit, said conduit having an office.

10. A valve assembly as claimed in claim 5, further comprising an air passage communicating said chamber with said second vapor passage.

11. A valve assembly as claimed in claim 2, wherein said second inlet port means includes a vent outlet opening and a vent inlet opening, said second valve element having one side opposed to said vent outlet opening and said vent inlet opening, and the other side contacted with said second spring.

12. A valve assembly as claimed in claim 11, wherein said vent outlet opening is communicated with a first vent passage connecting said second check valve with said fuel tank and said vent inlet opening is communicated with a second vent passage connecting said second check valve with said fuel vapor storage canister.

13. A valve assembly as claimed in claim 11, wherein said vent outlet opening is separated from said vent inlet opening by a partition wall in which a negative pressure relief valve is mounted.

14. A fuel vapor control system comprising:

a fuel tank having a filler tube through which fuel is fed to the fuel tank;

a fuel vapor storage canister;

a valve assembly including a housing having inlet port means adapted for establishing communication with said fuel tank at a level above the full level of fuel contained in said fuel tank, and outlet port means adapted for establishing communication with said fuel vapor storage canister;

said housing also having signal pressure port means adapted for establishing communication with said filler tube at a level above the fuel level of fuel contained in said filler tube;

a check valve mounted within said housing and fluidly disposed between said inlet port means and said outlet port means, said check valve including a valve seat communicating with said first inlet port means and a valve element cooperating with said first valve seat; and biasing means mounted within said housing for biasing said valve element toward said valve seat, said biasing means including a spring acting on and biasing said valve element toward said valve seat and a diaphragm;

said diaphragm cooperating with said housing to define within said housing a signal pressure chamber communicating with said signal pressure port means;

said diaphragm having one side exposed to a reference pressure as high as the ambient atmosphere and the opposite side exposed to a pressure within said signal pressure chamber, said diaphragm acting on and biasing said valve element against the action of said spring in response to a difference between said pressure within said signal pressure chamber and said reference pressure.

15. A fuel vapor control system as claimed in claim 14, further comprising means for venting fuel vapor from said fuel tank to said fuel vapor storage canister until the full level is reached by fuel contained in said fuel tank.

16. A fuel vapor control system as claimed in claim 15, wherein said venting means includes second inlet port means adapted for establishing communication with said fuel tank until the full level is reached by fuel contained in said fuel tank, a second check valve mounted within said housing and fluidly disposed between said second inlet port means and said outlet port means, said second check valve including a second valve seat communicating with said second inlet port means and a second valve element cooperating with said second valve seat, and second biasing means mounted within said housing for biasing said second valve element toward said second valve seat, said second biasing means including a second spring acting on and biasing said second valve element toward said second valve seat and a second diaphragm disposed adjacent below said signal pressure chamber, said second diaphragm having one side exposed to said pressure within said signal pressure chamber and the opposite side exposed to a pressure at said outlet port means, said second diaphragm acting on and biasing said second valve element in a direction assisting the action of said second spring in response to a difference between said pressure within said signal pressure chamber and said pressure at said outlet port means.

17. A fuel vapor control system comprising:

- a fuel tank having a filler tube through which fuel is fed to the fuel tank;
- a fuel vapor storage canister;
- a valve assembly including a housing having first inlet port means adapted for establishing communication with said fuel tank at a level above the full level of fuel contained in said fuel tank, second inlet port means adapted for establishing communication with said fuel tank at the full level of fuel contained in said fuel tank, and outlet port means adapted for establishing communication with said fuel vapor storage canister;
- said housing also having a signal pressure port means adapted for establishing communication with said filler tube at a level above the fuel level of fuel contained in said filler tube;
- a first check valve mounted within said housing and fluidly disposed between said first inlet port means and said outlet port means, said first check valve including a first valve seat communicating with said first inlet port means and a first valve element cooperating with said first valve seat;
- first biasing means mounted within said housing for biasing said first valve element toward said first valve seat, said first biasing means including a first spring acting on and biasing said first valve element toward said first valve seat and a first diaphragm;
- a second check valve mounted within said housing and fluidly disposed between said second inlet port means and said outlet port means, said second check valve including a second valve seat communicating with said second inlet port means and a second valve element cooperating with said second valve seat; and
- second biasing means mounted within said housing for biasing said second valve element toward said second valve seat, said second biasing means including a second spring acting on and biasing said second valve element toward said second valve seat and a second diaphragm;
- said first and second diaphragms cooperating with said housing to define within said housing a signal pressure chamber communicating with said signal port means;
- said first diaphragm having one side exposed to a reference pressure as high as the ambient atmosphere and the opposite side exposed to a pressure within said signal pressure chamber, said first diaphragm acting on and biasing said first valve element against the action of said first spring in response to a difference between said pressure within said signal pressure chamber and said reference pressure;
- said second diaphragm having one side exposed to said pressure within said signal pressure chamber and the opposite side exposed to a pressure at said outlet port means, said second diaphragm acting on and biasing said second valve element in a direction assisting the action of said second spring in response to a difference between said pressure within said signal pressure chamber and said pressure at said outlet port means.

* * * * *

UNITED STATES PATENT AND TRADEMARK OFFICE
CERTIFICATE OF CORRECTION

PATENT NO. : 5,584,278
DATED : December 17, 1996
INVENTOR(S) : Kazuo SATOH, Junya OHNO, and Junichi HANAI It is certified that error appears in the above-identified patent and that said Letters Patent is hereby corrected as shown below:

Title page, item

[73]  Nissan Motor Co., Ltd., Yokohama;
      NOK Corporation, Tokyo, both of Japan Signed and Sealed this Tenth Day of February, 1998

Attest:

BRUCE LEHMAN

Attesting Officer        Commissioner of Patents and Trademarks